United States Patent
McDaniel

(10) Patent No.: US 9,340,723 B2
(45) Date of Patent: May 17, 2016

(54) CATALYZED POLYAMINE SULFIDE SCAVENGERS AND METHODS OF USE IN SUBTERRANEAN TREATMENT FLUIDS

(71) Applicant: Halliburton Energy Services, Inc., Houston, TX (US)

(72) Inventor: Cato Russell McDaniel, Montgomery, TX (US)

(73) Assignee: Halliburton Energy Services, Inc., Houston, TX (US)

(*) Notice: Subject to any disclaimer, the term of this patent is extended or adjusted under 35 U.S.C. 154(b) by 208 days.

(21) Appl. No.: 13/927,903

(22) Filed: Jun. 26, 2013

(65) Prior Publication Data
US 2015/0000918 A1    Jan. 1, 2015

(51) Int. Cl.
| | |
|---|---|
| *C09K 8/532* | (2006.01) |
| *E21B 7/00* | (2006.01) |
| *E21B 41/02* | (2006.01) |
| *C09K 8/32* | (2006.01) |

(52) U.S. Cl.
CPC . *C09K 8/532* (2013.01); *C09K 8/32* (2013.01); *E21B 41/02* (2013.01); *C09K 2208/20* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 3,932,296 A * | 1/1976 | Byth | 507/240 |
| 4,332,967 A * | 6/1982 | Thompson et al. | 564/162 |
| 4,393,026 A * | 7/1983 | Thompson et al. | 422/12 |
| 4,473,115 A | 9/1984 | Oakes | |
| 4,805,708 A | 2/1989 | Matza et al. | |
| 4,843,176 A * | 6/1989 | Thompson et al. | 564/292 |
| 7,264,786 B2 | 9/2007 | Pakulski et al. | |
| 2004/0096382 A1 | 5/2004 | Smith et al. | |
| 2005/0065036 A1 | 3/2005 | Treybig et al. | |
| 2009/0242461 A1 | 10/2009 | Eldin et al. | |

OTHER PUBLICATIONS

International Search Report and Written Opinion issued in related PCT Application No. PCT/US2014/042982 mailed Oct. 27, 2014, 9 pages.
International Preliminary Report on Patentability issued in related PCT Application No. PCT/US2014/042982 mailed Jan. 7, 2016 (8 pages).

* cited by examiner

*Primary Examiner* — John J Figueroa
(74) *Attorney, Agent, or Firm* — Holly Soehnge; Baker Botts L.L.P.

(57) ABSTRACT

Improved methods and additives for eliminating or reducing concentrations of hydrogen sulfide or soluble sulfide ions for use in subterranean formations and fluids are provided. In one embodiment, the methods comprise: providing a treatment fluid comprising an oil-based liquid and a sulfide scavenging additive comprising one or more polyaliphatic amines and a catalyst comprising one or more quaternary ammonium salts; introducing the treatment fluid into at least a portion of a subterranean formation; and allowing the sulfide scavenging additive to interact with hydrogen sulfide or sulfide ions present in the treatment fluid.

20 Claims, 1 Drawing Sheet

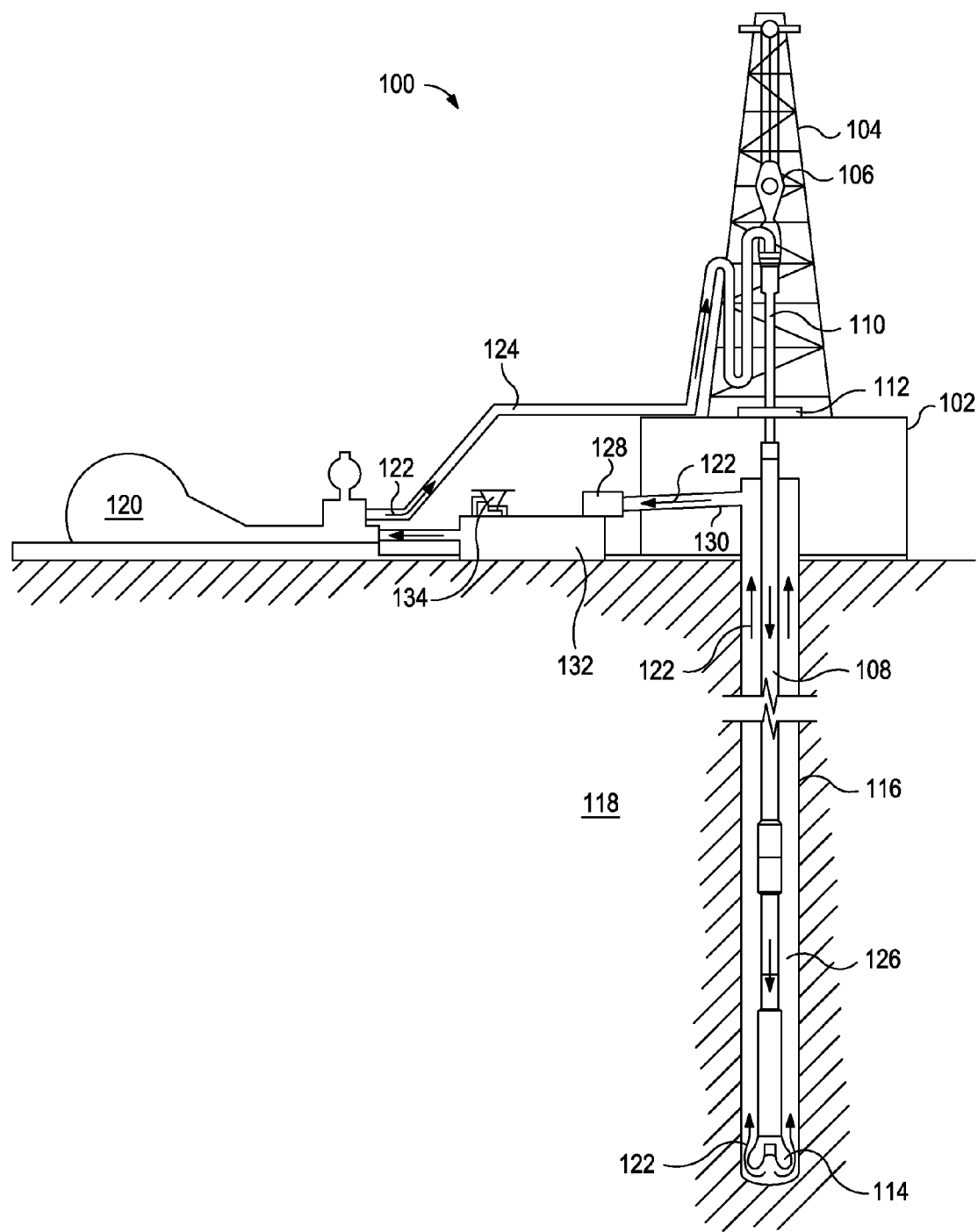

US 9,340,723 B2

CATALYZED POLYAMINE SULFIDE SCAVENGERS AND METHODS OF USE IN SUBTERRANEAN TREATMENT FLUIDS

BACKGROUND

The present disclosure relates to fluids, additives, and methods for use in subterranean operations, and more specifically, to improved methods and additives for eliminating or reducing concentrations of hydrogen sulfide or soluble sulfide ions for use in subterranean formations and fluids.

Hydrocarbon producing wells may contain many different formation sulfide, water, and other compounds. In order to evaluate the commercial value of a hydrocarbon producing well, or as an aid in operations and well planning, it is often useful to obtain information by analyzing the component concentrations of the produced fluid from a formation or an individual well. Numerous systems have been developed to evaluate a downhole fluid composition and the relative component concentrations in the downhole fluid.

Hydrogen sulfide ($H_2S$) is a very toxic, flammable, and pungent gas that causes numerous problems in various aspects of the oil and gas industry. H2S is extremely corrosive to metal, which may damage or destroy tubing, casings, or other types of well bore equipment. $H_2S$ also presents health risks to operations personnel that may be exposed to $H_2S$ gas at a well site or in processing of well bore fluids. Severe iron sulfide scaling may also choke production, either in the production piping, perforations or within the producing formation itself. Thus, it is typically desirable to reduce or eliminate sulfides from subterranean formations and well bores, among other reasons, to control corrosion rates and to plan for safe development and production of the hydrocarbons.

The release of $H_2S$ gas can sometimes be controlled by maintaining the pH of the fluid containing $H_2S$ above 10. However, in many cases, it is not practical or possible to maintain this level pH in a fluid for extended periods of time. Sulfide scavengers are often used to react with $H_2S$ and convert it to a more inert form. Conventional $H_2S$ scavengers include certain aldehydes, certain amine-based chemicals, triazines, copper compounds, hydrogen peroxide, zinc compounds, and iron compounds. However, the reaction products of many of these compounds with $H_2S$ are poorly soluble in treatment fluids and/or fluids in the well bore, or may decompose, thereby releasing $H_2S$. Moreover, many conventional sulfide scavengers themselves may have undesirable environmental and/or toxicity problems, and as such may be impractical to use or prohibited altogether in certain circumstances and/or jurisdictions.

SUMMARY

The present disclosure relates to fluids, additives, and methods for use in subterranean operations, and more specifically, to improved methods and additives for eliminating or reducing concentrations of hydrogen sulfide or soluble sulfide ions for use in subterranean formations and fluids.

In one embodiment, the present disclosure provides a method comprising: providing a treatment fluid comprising an oil-based liquid and a sulfide scavenging additive comprising one or more polyaliphatic amines and a catalyst comprising one or more quaternary ammonium salts; introducing the treatment fluid into at least a portion of a subterranean formation; and allowing the sulfide scavenging additive to interact with hydrogen sulfide or sulfide ions present in the treatment fluid.

In another embodiment, the present disclosure provides a method of treating a fluid comprising an oil-based liquid and a first concentration of hydrogen sulfide or sulfide ions, the method comprising: adding a sulfide scavenging additive to the fluid, the sulfide scavenging additive comprising one or more polyaliphatic amines and a catalyst comprising one or more quaternary ammonium salts; and allowing the sulfide scavenging additive to interact with at least a portion of the hydrogen sulfide or sulfide ions in the fluid to reduce the concentration of hydrogen sulfide or sulfide ions to a second concentration that is lower than the first concentration.

In another embodiment, the present disclosure provides a method comprising: providing a drilling fluid comprising an oil-based liquid and a sulfide scavenging additive comprising one or more polyaliphatic amines and a catalyst comprising one or more quaternary ammonium salts; using the drilling fluid to drill at least a portion of a well bore penetrating at least a portion of a subterranean formation; and allowing the sulfide scavenging additive to interact with hydrogen sulfide or sulfide ions present in the drilling fluid.

The features and advantages of the present disclosure will be readily apparent to those skilled in the art. While numerous changes may be made by those skilled in the art, such changes are within the spirit of the disclosure.

BRIEF DESCRIPTION OF THE FIGURES

Some specific example embodiments of the disclosure may be understood by referring, in part, to the following description and the accompanying drawings.

FIG. 1 illustrates an example of a well bore drilling assembly that may be used in accordance with certain embodiments of the present disclosure.

While the present disclosure is susceptible to various modifications and alternative forms, specific example embodiments have been shown in the figures and are herein described in more detail. It should be understood, however, that the description of specific example embodiments is not intended to limit the invention to the particular forms disclosed. On the contrary, this disclosure is to cover all modifications and equivalents as illustrated, in part, by the appended claims.

DESCRIPTION OF PREFERRED EMBODIMENTS

The present disclosure relates to fluids, additives, and methods for use in subterranean operations, and more specifically, to improved methods and additives for eliminating or reducing concentrations of hydrogen sulfide or soluble sulfide ions for use in subterranean formations and fluids.

The methods and treatment fluids of the present disclosure generally use sulfide scavenging additive systems comprising one or more polyaliphatic amines and a catalyst comprising one or more quaternary ammonium salts. It is believed that such sulfide scavenging additive systems will be soluble in oil-based fluids (e.g., treatment fluids), and thus capable of reacting with $H_2S$ and/or sulfide ions in such fluids to reduce the concentrations of those species in the fluid.

Among the many potential advantages of the present disclosure, the methods and compositions of the present disclosure may, among other things, provide a means of reducing or eliminating concentrations of hydrogen sulfide or soluble sulfide ions in oil-based treatment fluids more effectively and rapidly. For example, the sulfide scavenging additive systems described herein may be more soluble in oil-based treatment fluids than other sulfide scavenging additives known in the art. The methods and compositions of the present disclosure also may produce less residue or precipitate as compared to other sulfide scavenging additives known in the art (or, in some embodiments, may not produce a significant amount of residue or precipitate at all), thus reducing the amount of solid by-products of the sulfide scavenging process that must be filtered or removed from the treatment fluids treated using these methods and/or compositions.

The polyaliphatic amines used in the methods and compositions of the present disclosure may comprise any polyaliphatic amines or combination thereof known in the art. In certain embodiments, the polyaliphatic amines may comprise one or more amines of the following formula (1):

$$H_2NRNH—(RNH)_n—H \quad (1)$$

wherein R is an aliphatic radical and n is from about 0 to about 15. In certain embodiments, n in formula (1) above may be from about 0 to 10, or from about 1 to 5. The aliphatic radical R in formula (1) above may comprise an alkyl radical, an alkenyl radical, and/or an alkoxy radical, may comprise a straight or branched chain, and may be substituted or unsubstituted. In certain embodiments, the aliphatic group may be substituted with one or more organic or inorganic radicals. In certain embodiments, the aliphatic radical R may comprise an alkyl radical having 1 to 30 carbon atoms, an alkenyl radical having 2 to 30 carbon atoms, or an alkoxy radical having 1 to 30 carbon atoms. Suitable alkyl radicals may include, but are not limited to, methyl, ethyl, n-butyl, t-butyl, isopropyl, pentyl, and hexyl radicals. Suitable alkenyl radicals may include, but are not limited to, ethylene, methylethylene, trimethylene, phenylethylene, and propylene radicals. Suitable alkoxy radicals may include, but are not limited to, methoxy, ethoxy and isopropoxy radicals. In certain embodiments, the polyaliphatic amine may comprise a polyalkyleneamine. Examples of polyaliphatic amines that may be suitable for use in accordance with the present disclosure may include, but are not limited to, ethylenediamine, diethylenetriamine, triethylenetetraamine, tetraethylenepentamine, propylethylenediamine, tetrabutylenepentamine, hexaethyleneheptamine, hexapentyleneheptamine, heptaethyleneoctamine, octaethylenenonamine, nonaethylenedecamine, decaethyleneundecamine, decahexyleneundecamine, undecaethylenedodecamine, dodecaethylenetridecamine, tridecaethylenedodecamine, dodecaethylenetriamine, tridecaethylenetetradecamine, N-tallow propylenediamine, and the like.

The catalyst used in the methods and compositions of the present disclosure may comprise any quaternary ammonium salt or combination thereof known in the art. In certain embodiments, the catalyst may comprise one or more quaternary ammonium salts of the following formula (2):

$$R_1R_2R_3R_4N^+X^- \quad (2)$$

wherein $R_1$, $R_2$, $R_3$, and $R_4$ are alkyl or hydroxyalkyl groups having 1 to 30 carbon atoms or aryl groups having 6 to 30 carbon atoms, and X is a halide or metal sulfate. Examples of catalysts that may be suitable for use in accordance with the present disclosure may include, but are not limited to, alkyl benzyl ammonium chloride, benzyl cocoalkyl dimethyl quaternary ammonium chloride, dicocodimethylammonium chloride, ditallowedimethylammonium chloride, di(hydrogenated tallow alkyl) dimethyl quaternary ammonium methyl chloride, methyl bis(2-hydroxyethyl cocoalkyl quaternary ammonium chloride, dimethyl(2-ethyl) tallow ammonium methyl sulfate, hydrogenated tallow alkyl (2-ethylhyexyl) dimethyl quaternary ammonium methylsulfate, and the like.

The polyaliphatic amine(s) and catalyst may be added to or included in a treatment fluid in any amounts that effectively eliminate or reduce by the desired amount concentrations of $H_2S$ or sulfide ions that are present (e.g., as detected in fluids exiting the well bore) or expected to be present in the treatment fluid. In certain embodiments, the polyaliphatic amine(s) may be included in an amount of from about 50 ppm to about 3000 ppm by weight of the treatment fluid. In certain embodiments, the polyaliphatic amine(s) may be included in an amount of from about 50 ppm to about 1000 ppm by weight of the treatment fluid. The polyaliphatic amine(s) and catalyst also may be added to or included in a treatment fluid in any ratio that effectively eliminate or reduce by the desired amount concentrations of $H_2S$ or sulfide ions that are present (e.g., as detected in fluids exiting the well bore) or expected to be present in the treatment fluid. For example, the polyaliphatic amine-to-catalyst ratio may be from about 50:1 to about 1:1. In certain embodiments, the polyaliphatic amine-to-catalyst ratio may be from about 30:1 to about 5:1. In certain embodiments, the polyaliphatic amine-to-catalyst ratio may be about 17:1. As discussed below, an initial amount of the polyaliphatic amine and/or catalyst may be added to a treatment fluid, and subsequently, additional amounts of the polyaliphatic amine and/or catalyst may be added to the same fluid. This technique may be used, among other purposes, to increase and/or maintain a concentration of the polyaliphatic amine and/or catalyst that is sufficient to effectively eliminate or reduce by the desired amount concentrations of $H_2S$ or sulfide ions in the fluid throughout the course of a given operation.

The methods and compositions of the present disclosure may be used in conjunction with any oil-based fluid known in the art (e.g., oil-based treatment fluids) that includes an oil-based base fluid. Such base fluids may comprise any number of organic liquids (or combination thereof), including but not limited to, mineral oils, synthetic oils, esters, and the like. In certain embodiments, the treatment fluids in the present disclosure may comprise emulsions (including invert emulsions), suspensions, gels, foams, or other mixtures of oil-based liquids with other liquids, solids and/or gases.

The treatment fluids used in the present disclosure optionally may comprise any number of additional additives, including, but not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, additional $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the fluids of the present disclosure for a particular application.

The methods and compositions of the present disclosure may be used during or in conjunction with any subterranean operation wherein a treatment fluid is used or treated. In certain embodiments, the methods and compositions of the present disclosure may be used in the course of drilling operations. In these embodiments, the methods and compositions of the present disclosure may be used to reduce or eliminate concentrations of $H_2S$ from a drilling fluid used in drilling a well or borehole, for example, in a hydrocarbon-bearing subterranean formation where $H_2S$ is often encountered. Other suitable subterranean operations may include, but are not limited to, preflush treatments, afterflush treatments, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like.

The polyaliphatic amine and/or the catalyst may be provided in an additive in a solid form, liquid form (e.g., in solution with a solvent), or a combination thereof. The polyaliphatic amine and the catalyst may be added to a fluid by any means known in the art, and may be added together or separately. The polyaliphatic amine and/or the catalyst may be added to the fluid, for example, in the mud pit before the fluid has circulated or before the fluid contains any detectable amount of sulphur or $H_2S$, as a prophylactic measure against any $H_2S$ the fluid may encounter downhole. In certain embodiments, the polyaliphatic amine and/or the catalyst may be added after the fluid has been circulating downhole and has already encountered sulphur or $H_2S$ and contains same. In certain embodiments, the amount of the polyaliphatic amine and/or the catalyst added to the fluid may be controlled and/or varied during the course of an operation based on, among other things, the amount of sulfur or $H_2S$ detected in fluids exiting the well bore. In these embodiments, any system or technique capable of monitoring or detecting sulfur or $H_2S$ content in fluids exiting the well bore may be used. Moreover, the polyaliphatic amine and/or the catalyst may be added to a fluid in multiple portions that are added to the fluid at separate intervals over a period of time. For example, a first amount of polyaliphatic amine and/or the catalyst may be added to a fluid at one point in time in the course of a particular operation. At a subsequent point during that operation, an elevated amount of sulfur or $H_2S$ may be detected exiting the well bore, at which point a second amount of polyaliphatic amine and/or the catalyst may be added to the fluid based at least in part on the amount of sulfur or $H_2S$ detected.

The exemplary fluids and additives disclosed herein may directly or indirectly affect one or more components or pieces of equipment associated with the preparation, delivery, recapture, recycling, reuse, and/or disposal of the disclosed fluids and additives. For example, and with reference to FIG. 1, the disclosed fluids and additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary fluids and additives.

The disclosed fluids and additives may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed fluids and additives may also directly or indirectly affect the various downhole equipment and tools that may come into contact with the fluids and additives such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids and additives may also directly or indirectly affect any downhole heat exchangers, valves and corresponding actuation devices, tool seals, packers and other wellbore isolation devices or components, and the like associated with the wellbore 116. The disclosed fluids and additives may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids and additives may also directly or indirectly affect any transport or delivery equipment used to convey the fluids and additives to the drilling assembly 100 such as, for example, any transport vessels, conduits, pipelines, trucks, tubulars, and/or pipes used to fluidically move the fluids and additives from one location to another, any pumps, compressors, or motors used to drive the fluids and additives into motion, any valves or related joints used to regulate the pressure or flow rate of the fluids and additives, and any sensors (i.e., pressure and temperature), gauges, and/or combinations thereof, and the like.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a treatment fluid comprising an oil-based liquid and a sulfide scavenging additive comprising one or more polyaliphatic amines and a catalyst comprising one or more quaternary ammonium salts;
introducing the treatment fluid into at least a portion of a subterranean formation; and
allowing the sulfide scavenging additive to interact with hydrogen sulfide or sulfide ions present in the treatment fluid.

2. The method of claim 1 wherein the one or more polyaliphatic amines comprise at least one polyaliphatic amine having the following formula:

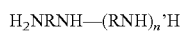

wherein R is an aliphatic radical and n is from about 0 to about 15.

3. The method of claim 1 wherein the one or more polyaliphatic amines comprises at least one polyaliphatic amine selected from the group consisting of:
ethylenediamine, diethylenetriamine, triethylenetetraamine, tetraethylenepentamine, propylethylenediamine, tetrabutylenepentamine, hexaethyleneheptamine, hexapentyleneheptamine, heptaethyleneoctamine, octaethylenenonamine, nonaethylenedecamine, decaethyleneundecamine, decahexyleneundecamine, undecaethylenedodecamine, dodecaethylenetridecamine, tridecaethylenedodecamine, dodecaethylenetriamine, tridecaethylenetetradecamine, N-tallow propylenediamine, and any combination thereof.

4. The method of claim 1 wherein the one or more quaternary ammonium salts comprise at least one quaternary ammonium salt having the following formula:

wherein $R_1$, $R_2$, $R_3$, and $R_4$ are alkyl or hydroxyalkyl groups having 1 to 30 carbon atoms or aryl groups having 6 to 30 carbon atoms, and wherein X is a halide or metal sulfate.

5. The method of claim 1 wherein the one or more quaternary ammonium salts comprise at least one quaternary ammonium salt selected from the group consisting of:
alkyl benzyl ammonium chloride, benzyl cocoalkyl dimethyl quaternary ammonium chloride, dicocodimethylammonium chloride, ditallowedimethylammonium chloride, di(hydrogenated tallow alkyl) dimethyl quaternary ammonium methyl chloride, methyl bis(2-hydroxyethyl cocoalkyl quaternary ammonium chloride, dimethyl(2-ethyl) tallow ammonium methyl sulfate, hydrogenated tallow alkyl (2-ethylhyexyl) dimethyl quaternary ammonium methylsulfate, and any combination thereof.

6. The method of claim 1 wherein the treatment fluid is an emulsion, a suspension, a gel, a foam, or a mixture of fluids.

7. The method of claim 1 further comprising adding an additional amount of one or more polyaliphatic amines to the treatment fluid after the treatment fluid has been introduced into at least a portion of a subterranean formation.

8. The method of claim 1 further comprising adding an additional amount of a catalyst comprising one or more quaternary ammonium salts to the treatment fluid after the treatment fluid has been introduced into at least a portion of a subterranean formation.

9. The method of claim 1 wherein the treatment fluid comprises a drilling fluid.

10. The method of claim 1 further comprising reducing the concentration of hydrogen sulfide or sulfide ions in the treatment fluid.

11. The method of claim 1 further comprising detecting a first concentration of hydrogen sulfide or sulfide ions in the treatment fluid while the treatment fluid is present in at least a portion of the subterranean formation.

12. The method of claim 11 wherein the sulfide scavenging additive is added to the treatment fluid in an amount that is determined based at least in part on the first concentration of hydrogen sulfide or sulfide ions detected in the treatment fluid.

13. A method of treating a fluid comprising an oil-based liquid and a first concentration of hydrogen sulfide or sulfide ions, the method comprising:
adding a sulfide scavenging additive to the fluid, the sulfide scavenging additive comprising one or more polyaliphatic amines and a catalyst comprising one or more quaternary ammonium salts; and allowing the sulfide scavenging additive to interact with at least a portion of the hydrogen sulfide or sulfide ions in the fluid to reduce the concentration of hydrogen sulfide or sulfide ions to a second concentration that is lower than the first concentration.

14. The method of claim 13 wherein the fluid comprises a subterranean treatment fluid.

15. The method of claim 13 further comprising detecting the first concentration of hydrogen sulfide or sulfide ions in the fluid while the fluid is present in at least a portion of a subterranean formation.

16. The method of claim 15 wherein the sulfide scavenging additive is added to the fluid in an amount that is determined based at least in part on the first concentration of hydrogen sulfide or sulfide ions detected in the fluid.

17. The method of claim 13 further comprising:
detecting a third concentration of hydrogen sulfide or sulfide ions in the fluid while the fluid is present in at least a portion of a subterranean formation, wherein the third concentration is higher than the second concentration;
adding a second amount of a sulfide scavenging additive to the fluid, the sulfide scavenging additive comprising one or more polyaliphatic amines and a catalyst comprising one or more quaternary ammonium salts; and
allowing the second amount of the sulfide scavenging additive to interact with at least a portion of the hydrogen sulfide or sulfide ions in the fluid to reduce the concentration of hydrogen sulfide or sulfide ions to a fourth concentration that is lower than the third concentration.

18. A method comprising:
providing a drilling fluid comprising an oil-based liquid and a sulfide scavenging additive comprising one or more polyaliphatic amines and a catalyst comprising one or more quaternary ammonium salts;
using the drilling fluid to drill at least a portion of a well bore penetrating at least a portion of a subterranean formation; and
allowing the sulfide scavenging additive to interact with hydrogen sulfide or sulfide ions present in the drilling fluid.

19. The method of claim 18 further comprising detecting a first concentration of hydrogen sulfide or sulfide ions in the drilling fluid while the drilling fluid is present in at least a portion of the well bore.

20. The method of claim 19 wherein the sulfide scavenging additive is added to the drilling fluid in an amount that is determined based at least in part on the first concentration of hydrogen sulfide or sulfide ions detected in the drilling fluid.

* * * * *